US 6,736,543 B2

(12) United States Patent
Couturet

(10) Patent No.: US 6,736,543 B2
(45) Date of Patent: May 18, 2004

(54) STEERING SET FOR BICYCLES AND ADAPTER FOR SUCH A STEERING SET

(75) Inventor: Jean-Pierre Couturet, Nevers (FR)

(73) Assignee: Look Cycle Internationale, Nevers (FR)

( * ) Notice: Subject to any disclaimer, the term of this patent is extended or adjusted under 35 U.S.C. 154(b) by 45 days.

(21) Appl. No.: 10/253,697

(22) Filed: Sep. 25, 2002

(65) Prior Publication Data

US 2003/0059145 A1 Mar. 27, 2003

(30) Foreign Application Priority Data

Sep. 26, 2001 (FR) .......................................... 01 12355

(51) Int. Cl.$^7$ ............................................... B62K 21/18
(52) U.S. Cl. ...................................... 384/545; 280/279
(58) Field of Search .............................. 384/538, 545; 280/276, 279

(56) References Cited

U.S. PATENT DOCUMENTS

| | | | | | |
|---|---|---|---|---|---|
| 4,189,167 A | * | 2/1980 | Dubois | ...................... | 280/279 |
| 5,330,220 A | * | 7/1994 | Nagano | ...................... | 280/279 |
| 5,405,202 A | * | 4/1995 | Chi | ............................. | 384/545 |
| 6,126,323 A | * | 10/2000 | Tange | ......................... | 384/545 |
| 6,302,589 B1 | * | 10/2001 | Van Houtte | ................. | 384/545 |
| 6,416,071 B2 | * | 7/2002 | Marui | ........................ | 280/279 |
| 6,497,425 B1 | * | 12/2002 | Tange | ......................... | 280/279 |

FOREIGN PATENT DOCUMENTS

| | | |
|---|---|---|
| DE | 299 05 860 U 1 | 7/1999 |
| GB | 2 328 913 A | 3/1999 |

\* cited by examiner

*Primary Examiner*—Thomas R. Hannon
(74) *Attorney, Agent, or Firm*—Young & Thompson

(57) ABSTRACT

The steering set comprises an upper roller bearing (2) and a lower roller bearing (18) adapted to guide in rotation a pivot tube. Each roller bearing is (2, 18) received in a respective annular recess (14, 19) provided within a steering post (11) forming a part of a bicycle frame (12). Each roller bearing (2, 18) is associated with a respective ring (3, 24) itself resting on a support surface, and an end ring (6) surrounded the pivot tube (10) above the steering socket (11). The roller bearings (2, 18) are associated with adapters (26, 27) in the form of rings disposed between the roller bearings (2, 18) and the bottom of the annular recess (14, 19) so as to adjust the height of the recess so as to adapt it to roller bearings (2, 18) having different heights.

11 Claims, 2 Drawing Sheets

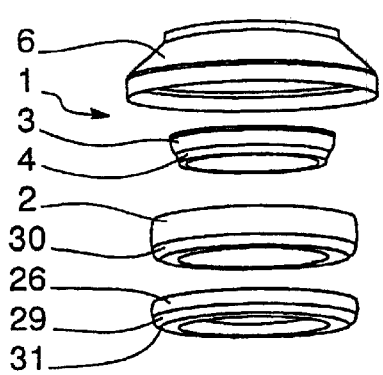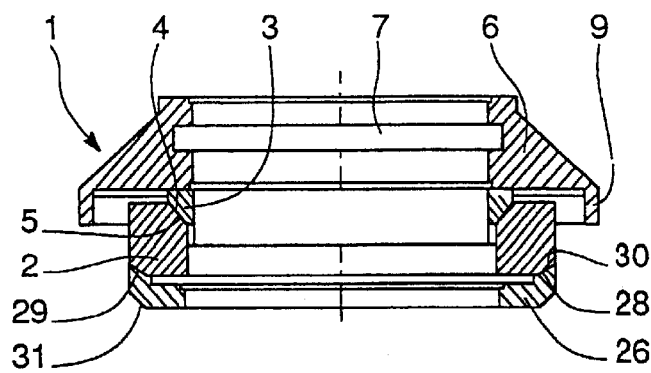
FIG. 1a      FIG. 1b
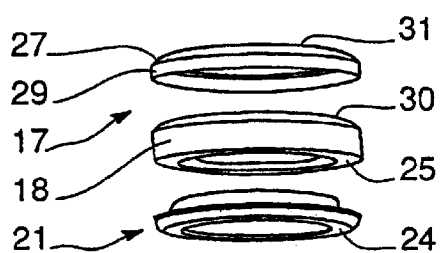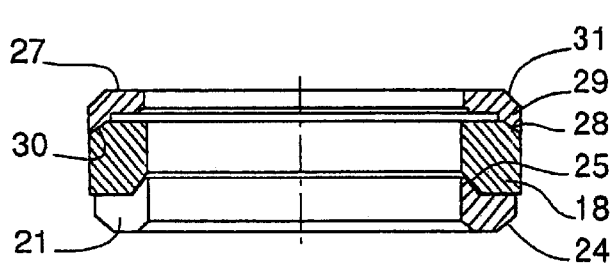
FIG. 2a      FIG. 2b
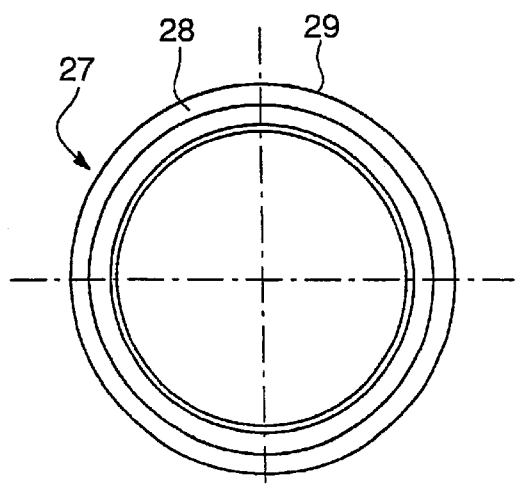
FIG. 3

FIG. 4

STEERING SET FOR BICYCLES AND ADAPTER FOR SUCH A STEERING SET

The present invention relates to a bicycle steering set, as well as an adapter for such a bicycle steering set.

The steering set of the invention is a steering set comprising roller bearings within the steering socket of the bicycle.

Such steering sets are known, which comprise a lower roller bearing and an upper roller bearing adapted to guide in rotation a pivot tube disposed within the steering socket of a bicycle frame. These roller bearings are disposed in a respective recess delimited by a shoulder machined within the steering socket.

A steering post bearing the handlebars is secured to its upper portion of the pivot tube and serves also to block the assembly axially when the elements are mounted in the steering socket. At the opposite end of the pivot tube, a fork head is fixed in rotation on the pivot tube and serves as an axial abutment means for the assembly.

This construction is relatively rigid whilst permitting easy manipulation of the handlebars during pedaling. However, the interior of the steering socket is specially machined so as to accommodate the recesses for the roller bearings having a predetermined height and this so that the choice of roller bearing remains that of the manufacturer. It is thus impossible to replace the roller bearings by another roller bearing assembly having a different height.

On the other hand, nothing is provided to overcome the deterioration or wear of the bearing surfaces machined in the steering socket.

The object of the invention is to overcome these drawbacks by providing a steering set comprising an element permitting mounting other roller bearings than those initially provided by the manufacturer, and which moreover permits easily overcoming the wear of certain parts of the steering set.

The object of the invention is a bicycle steering set, comprising a lower roller bearing and an upper roller bearing adapted to guide in rotation a pivot tube, each roller bearing being adapted to be received in a respective annular recess provided within a steering socket forming a part of the bicycle frame, each roller bearing being associated with a respective ring resting on a support surface of this latter, and an end ring adapted to surround the pivot tube above the steering socket, characterized by the fact that at least one of the roller bearings is moreover associated with an adapter in the form of a ring adapted to be disposed between the roller bearing and the bottom of the annular recess so as to adjust the height of the recess so as to adapt the latter to roller bearings having different heights.

According to other characteristics of the invention:
the adapter has on one side a first support of complementary shape to a support surface on the roller bearing, and on the other side a second support surface of a shape complementary to the bottom surface of the recess in which the adapter is adapted to be disposed;
the adapter comprises on its periphery an axial extension collar having said first support surface for the roller bearing;
the complementary shapes comprise conical surfaces;
the adapter is split;
an adapter is associated with each roller bearing.

The invention also has for its object an adapter for a bicycle steering set, characterized by the fact that it is constituted by a ring adapted to be disposed at the bottom of an annular recess within a steering socket, so as to adjust the height of the recess relative to roller bearings having different heights.

According to other characteristics of the invention:
the adapter comprises on its periphery an axial extension collar having a support surface for a roller bearing;
the adapter has on one side a first support surface of a shape complementary to a support surface on the roller bearing, and on the other side a second support surface of a shape complementary to the surface of the bottom of the recess in which the adapter is adapted to be disposed;
the first and second support surfaces of the adapter are conical;
the ring forming the adapter is split.

Other characteristics and advantages of the invention will become apparent from the description which follows of two non-limiting examples of the invention, with reference to the accompanying drawings, in which:

FIGS. 1a and 1b are schematic perspective views respectively in cross-section showing the elements of the upper portion of the steering set, in FIG. 1a, in the form of an exploded view, and in FIG. 1b in the form of a longitudinal cross-sectional view of the assembled elements;

FIGS. 2a and 2b are schematic perspective views respectively in cross-section showing the elements of the lower portion of the steering set, in FIG. 2a in the form of an exploded view and in FIG. 2b in the form of a longitudinal cross-sectional view of the assembled elements;

FIG. 3 is a bottom view of the upper element of FIGS. 2a and 2b, this element constituting the adapter according to the invention;

FIG. 4 is an assembly view in partial longitudinal cross-section of a steering socket on which a steering set according to the invention is mounted.

In the figures, identical or equivalent elements will have the same reference numerals.

Figure 4:
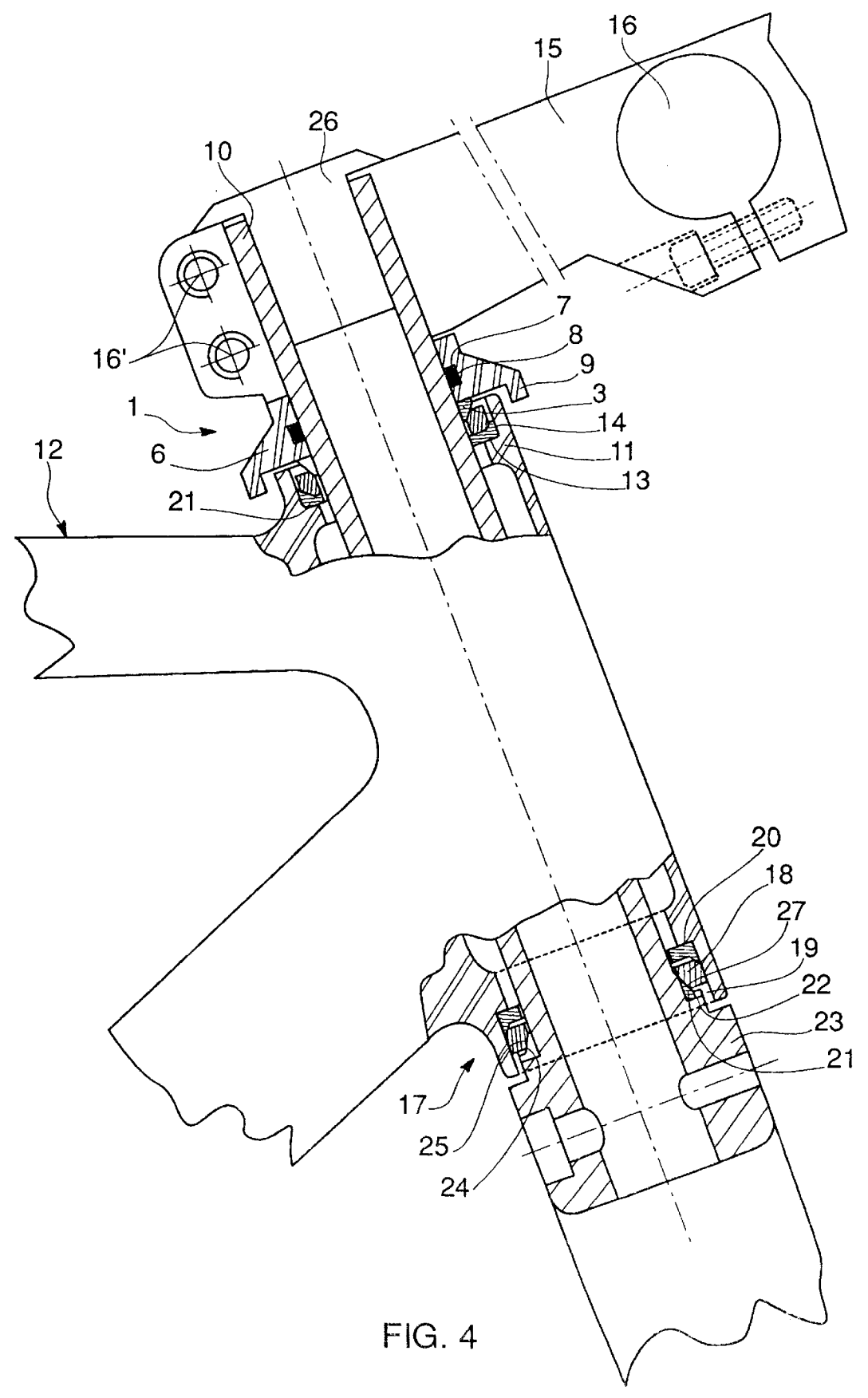

FIGS. 1a, 1b and 4 show the elements of the upper portion 1 of a steering set according to the invention. This upper portion comprises a so-called upper roller bearing 2 which preferably is a roller bearing with rollers shown very schematically in the figures.

This roller bearing 2 coacts with a locking ring 3 provided on a conical surface 4 bearing against a conical surface 5 forming a support on the upper internal edge of the roller bearing 2.

An end ring 6 with an overall conical external surface caps the locking ring 3 by urging it toward the roller bearing 2. On its internal surface, the end ring 6 comprises a throat 7 defining a recess for an O-ring 8 (see FIG. 4). This end ring is moreover provided with a protective skirt 9.

FIG. 4 shows the elements 2, 3 and 6 after their assembly on a pivot tube upper fork 10 so as to connect the latter to a steering socket 11 forming a part of the bicycle frame 12.

To receive the roller bearing 2, the steering socket 11 is at its upper end provided with a shoulder 21 defining, with the internal wall of the steering socket, an annular recess 14. The roller bearing 2 is disposed in this recess, about pivot tube 10 for which 10 constitutes a guide member in rotation.

The roller bearing 2 is mounted with slight play about the upper end of the pivot tube 10, and also has a slight play on the external side relative to the recess 14 within the steering socket 11, so as to be able to turn freely in this latter without touching the walls.

The connection between the roller bearing 2 and the pivot tube 10 is ensured by the locking ring 3 locked between the roller bearing and the lower surface of the end ring 6 through which the pivot tube projects to provide a securement surface with a post 15 provided with a through hole 16 receiving the handlebars (not shown) of the bicycle. The post 15 is secured to the pivot tube 10 in the manner of a collar with the help of a set screw 16'.

FIGS. 2a, 2b and 4 show the elements of the lower portion 17 of the steering set according to the invention. This lower portion 17 is symmetrical relative to the upper portion 1 and comprises analogous elements.

Thus, the lower portion 17 of the steering set comprises a so-called lower roller bearing 18 received in a recess 19 defined in the internal wall of the steering socket 10 and by a shoulder 20 provided in this wall.

The connection between the roller bearing 18 and the pivot tube is ensured by a ring 21 mounted locked against a support surface constituted by a shoulder 22 on a fork head 23 formed at the lower end of the pivot tube and connected to the fork (not shown) of the bicycle.

The ring 21 or the fork cone comprises a conical support surface 24 against which rests a corresponding conical support 25 of the lower roller bearing 18. It ensures the centering of the lower roller bearing 18, thanks to the conical portion 24. This ring is split in the example shown in FIG. 4.

As in the upper portion 1 of the steering set, the lower roller bearing 18 is mounted with slight play about the lower end of the pivot tube 10, and also has a slight play upwardly relative to the recess in the interior of the steering post 11, so as to be able to turn freely.

In the example shown in FIG. 4, the support in the axial direction of the entire assembly of steering members is provided by means located above the steering set, which are, in this order: the post 15, if desired one or several intermediate rings forming a partition, and finally an upper plug 26 mounted at the upper portion of the pivot tube 10 so as to close the latter from above.

During locking of the assembly, the locking ring 3 is disposed in the conical upper portion of the upper roller bearing 2 and ensures the guiding of the upper portion of the forked pivot tube 10. The taking up of the play between the elements is ensured by vertical pressure, directed downwardly, transmitted by means of the outer ring 6.

According to the invention, at least one of the roller bearings is associated with an adapter in the form of a ring adapted to be disposed between the roller bearing 2, 18 and the bottom of the corresponding annular recess 14, 19. Its internal diameter is greater than that of the pivot tube 10, but smaller than that of the passage in the steering socket at this point.

In the embodiment shown in the figures, the steering set comprises such adapters 26 and 27, of which one, 26, is associated with the upper roller bearing 2, and the other, 27, is associated with the lower roller bearing.

Each adapter 26, 27 comprises a first support surface 28 against which the roller bearing 2, 3 bears. This first support surface 28 is in the illustrated example disposed on an axial extension collar 29 on the periphery of the adapter.

The first support surface 28 of each adapter 26, 27 is, in the embodiment shown in the figures, conical, so as to coact with the support surface 30 of complementary shape on the corresponding roller bearing 2, 18. Each adapter 26, 27 thus has on one side a first support surface 28, and on the other side a second support surface 31 of a shape complementary to the surface of the bottom of the recess 14, 19 in which the adapter is disposed.

Preferably, the ring forming the adapter is split so as better to adapt to the internal diameter of the recess, which may vary slightly.

The adapter moreover ensures the positioning of the roller bearing relative to the axis of the steering socket.

There is thus obtained a steering set comprising an adapter permitting adjusting the height of the recess of the roller bearing so as to adapt the recess to roller bearings having different heights, which gives the possibility of replacing the roller bearing with another roller bearing than that initially chosen by the manufacturer.

If the support surfaces are machined, it is also easy to replace the adapter so as to compensate the reduction in height of the recess which arises from this wear. Similarly, in the case of damage to the adapter itself, it can easily be replaced.

Of course, the invention is not limited to the examples shown and described, but also comprises all modifications envisageable by those skilled in the art. Thus, it is of course possible to use a single adapter in a steering set if the reduction provided to the height of one of the roller bearing recesses is sufficient.

What is claimed is:

1. Bicycle steering set, comprising an upper roller bearing (2) and a lower roller bearing (18) adapted to guide in rotation a pivot tube, each roller bearing (2, 18) being adapted to be received in a respective annular recess (14, 19) provided within a steering socket (11) forming part of a frame (12) of a bicycle, each roller bearing (2, 18) being associated with a respective ring (3, 24) resting on a support surface of the latter, and an end ring (6) adapted to surround the pivot tube (10) above the steering socket (11), characterized by the fact that at least one of the roller bearings (2, 18) is associated with an adapter (26, 27) in the form of a ring adapted to be disposed between the roller bearing (2, 18) and the bottom of the annular recess (14, 19) so as to adjust the height of the recess so as to adapt the latter to roller bearings (2, 18) having different heights.

2. Bicycle steering set according to claim 1, characterized by the fact that the adapter (26, 27) has on one side a first support surface (28) of a shape complementary to a support surface (30) on the roller bearing (2, 18), and on the other side a second support surface (31) of a shape complementary to the surface of the bottom of the recess (14, 19) in which the adapter (26, 27) is adapted to be disposed.

3. Bicycle steering set according to claim 2, characterized by the fact that the complementary shapes (28, 31) comprise conical surfaces.

4. Bicycle steering set according to claim 1, characterized by the fact that the adapter (26, 27) comprises on its periphery an axial extension collar (29) having said first support surface (28) for the roller bearing (2, 18).

5. Bicycle steering set according to claim 1, characterized by the fact that the adapter (26, 27) is split.

6. Bicycle steering set according to claim 1, characterized by the fact that an adapter (26, 27) is associated with each roller bearing (2, 18).

7. Adapter for a bicycle steering set, characterized by the fact that it is constituted by a ring (26, 27) adapted to be disposed at the bottom of an annular recess (14, 19) within a steering socket (11), so as to adjust the height of the recess (14, 19) relative to roller bearings (2, 18) having different heights.

8. Adapter for a bicycle steering set according to claim 7, characterized by the fact that it comprises on its periphery an axial extension collar (29) having a support surface (28) for a roller bearing (2, 18).

9. Adapter for a bicycle steering set according to claim 7, characterized by the fact that it has on one side a first support surface (28) of a shape complementary to that of a support surface (30) on the roller bearing (2, 18), and on the other side a second support surface (31) of a shape complementary to the surface of the bottom of the recess (14, 19) in which the adapter (26, 27) is adapted to be disposed.

10. Adapter for a bicycle steering set according to claim 9, characterized by the fact that the first and second support surfaces (28, 31) of the adapter (26, 27) are conical.

11. Adapter for a bicycle steering set according to claim 7, characterized by the fact that the ring forming an adapter (26, 27) is split.

* * * * *